United States Patent
Nishimura

(10) Patent No.: US 8,873,096 B2
(45) Date of Patent: Oct. 28, 2014

(54) MEDIA PROCESSING DEVICE AND POS SYSTEM

(71) Applicant: Seiko Epson Corporation, Tokyo (JP)

(72) Inventor: Hideki Nishimura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/870,844

(22) Filed: Apr. 25, 2013

(65) Prior Publication Data

US 2013/0314726 A1    Nov. 28, 2013

(30) Foreign Application Priority Data

May 22, 2012  (JP) ................... 2012-116882
May 24, 2012  (JP) ................... 2012-118312

(51) Int. Cl.
*G06F 3/12*     (2006.01)
*G07G 5/00*     (2006.01)
*G06Q 20/20*    (2012.01)

(52) U.S. Cl.
CPC ............ *G06F 3/1281* (2013.01); *G06F 3/1244* (2013.01); *G07G 5/00* (2013.01); *G06F 3/1291* (2013.01); *G06F 3/1284* (2013.01); *G06Q 20/209* (2013.01); *G06F 3/1204* (2013.01); *G06F 3/1206* (2013.01); *G06Q 20/202* (2013.01)

USPC ................. 358/1.15; 709/201; 709/209

(58) Field of Classification Search
CPC .................................................... G06F 3/1243
USPC ............................ 709/201, 209; 358/1.5
See application file for complete search history.

(56) References Cited

U.S. PATENT DOCUMENTS

| 8,033,452 B2 | 10/2011 | Koakutsu |
| 8,215,544 B2 | 7/2012 | Koakutsu |
| 2011/0315755 A1* | 12/2011 | Koakutsu ........................ 235/3 |
| 2012/0243046 A1 | 9/2012 | Koakutsu |

FOREIGN PATENT DOCUMENTS

JP    2009-199588 A    9/2009

* cited by examiner

*Primary Examiner* — Eric A Rust

(57) ABSTRACT

A multifunction device 100 has a roll paper print unit 120; a first interface 110 that receives text data from a POS terminal 20; a second interface 115 connected to a printer 200; a data interpreter 155 that determines if a predetermined string is contained in the received text data; and a control unit 150 that, based on the result from the data interpreter 155, switches to a first operating mode for executing processes with the roll paper print unit 120, or a second operating mode that passes the received text data through the second interface 115 to the printer 200.

12 Claims, 8 Drawing Sheets

MEDIA PROCESSING DEVICE AND POS SYSTEM

BACKGROUND

1. Technical Field

The present invention relates to a media processing device and a POS system.

The present application claims the priority of Japan Patent Application No. 2012-116882, filed on May 22, 2012, and Japan Patent Application No. 2012-118312 filed on May 24, 2012, all contents of which are herein incorporated by reference.

2. Related Art

A printer as an example of a media processing device, and a POS (point-of-sale) system having a plurality of printers, are known from the literature. See, for example, Japanese Unexamined Patent Appl. Pub. JP-A-2009-199588. In the system described in JP-A-2009-199588, a receipt printer (first printer) that prints receipts is connected to a POS register, and a label printer that prints labels is connected to the first (receipt) printer. When the POS register outputs transaction data, the receipt printer prints a receipt. The receipt printer also outputs print data for producing a label if a specific condition is met. The label printer then prints a label based on the print data for a label output by the receipt printer.

Both a dedicated receipt printer for printing receipts, and a dedicated label printer for printing labels, are thus connected in the foregoing system of the related art. In other words, dedicated media processing devices used for different processes are connected. Because each of the media processing devices is used for a fixed purpose, there is no need to control how the media processing devices are used.

However, in a system having a plurality of connected media processing devices with each media processing device having the same function, controlling which media processing device operates under what conditions is required. The computer or other control device that controls the media processing devices must therefore control each of the plural media processing devices.

SUMMARY

The present invention is directed to this problem, and provides a simple method of appropriately using plural media processing devices.

One aspect of the invention is a media processing device including: a processing unit that processes media; a first connection unit that receives data including a command and text data sent from a host computer; a second connection unit that connects to an external processing device; and a control unit that controls executing a process by the processing unit, or controls sending the data received by the first connection unit to the external processing device connected to the second connection unit, based on the data received by the first connection unit.

Preferably, the media processing device also has an interpreting unit that searches the text data for a predetermined string; and the control unit executes control based on the result of interpretation by the interpreting unit.

This aspect of the invention enables a media processing device that receives a command sent from a host computer and processes media based on the received command to send text data received from the host computer to an external processing device for processing by the external processing device. When a predetermined string is contained in the text data sent from the host computer, the media processing device switches between two operating modes. More specifically, by including a specific string in the transmitted text data, the host computer can change the operating mode of the media processing device. This enables the host computer to easily change the operating mode of the media processing device, and selectively use the media processing device and external processing device.

The host computer can also cause the operating mode to change by including a specific string in the text data. As a result, changing the operating mode can be controlled without expanding a command or command set even when a command related to changing the operating mode is not contained in the application executed by the host computer or the commands used by the multifunction device. There is, therefore, no need to change the host computer application that outputs commands. For example, the application used on an existing host computer can be used without modification.

Preferably, the processing unit is a print unit that prints text on a specific sheet; the predetermined string is a string that is not printed by the print unit; and the interpreting unit determines if a string that is not printed by the print unit is included in the text data received by the first connection unit.

The media processing device that prints text based on text data according to this aspect of the invention detects a predetermined string in text data related to the printed characters, and changes the operating mode. As a result, the host computer can change the operating mode if the host computer has a function that also sends text data related to the text to print with a command instructing the media processing device to print. Use of the media processing device and external processing device can therefore be controlled without changing the host computer application or command set. Furthermore, because the string included in the text data is a string that is not printed by the print unit, this string can be clearly differentiated from the text data to be printed, and operating errors caused by detection errors are prevented.

Preferably, when the control unit controls executing a process by the processing unit based on the string detected by the interpreting unit, the print unit prints the text data remaining after removing the predetermined string from the received text data.

In this aspect of the invention the media processing device executes a process based on the text data after removing the string included in the text data for the purpose of changing the operating mode. Because the string for changing the operating mode therefore does not affect processing the media, the host computer can more appropriately differentiate using the media processing device and external processing device.

Preferably, the media processing device also has a conversion unit that converts a command received by the first connection unit to a command processed by the processing unit or a command processed by the external processing device.

The media processing device according to this aspect of the invention converts a command received by the media processing device from the host computer to a command executed by the processing unit or the external processing device. As a result, even if the media processing device or external processing device is connected to a host computer that uses different commands, the media processing device and external processing device can be appropriately operated without modifying any commands output from the application run by the host computer.

Another aspect of the invention is a POS system including a POS terminal that sends data including a command and text data, a first media processing device, and a second media processing device. The first media processing device includes a processing unit that processes media; a first connection unit that receives the data sent from the POS terminal; an interpreting unit that searches the text data received by the first connection unit for a predetermined string; a control unit that changes to a first operating mode that executes a process with the processing unit, or a second operating mode that transmits the text data received by the first connection unit from the second connection unit, and controls operation in the first operating mode or second operating mode, based on the result of searching by the interpreting unit; and a second connection unit that transmits the text data when the second operating mode is enabled. The second media processing device includes a receiving unit that connects to the second connection unit of the first media processing device, and receives data transmitted from the second connection unit; and a media processing unit that performs a process common to the processing unit of the first media processing device based on data received by the receiving unit.

With the POS system according to this aspect of the invention, the POS terminal can easily change between an operating mode in which the first media processing device executes a process, and an operating mode in which the second media processing device executes a process, by including a specific string in the text data output by the POS terminal. As a result, the POS terminal uses the first and second media processing devices appropriately by means of a simple process. Furthermore, because the operating mode changes when a predetermined string is contained in the text data output by the POS terminal, changing the operating mode can be controlled without expanding a command or command set even when a command related to changing the operating mode is not contained in the application executed by the POS terminal or the commands used by the first media processing device. There is, therefore, no need to change a POS terminal command. For example, the application used on an existing POS terminal can be used without modification.

In a POS system according to another aspect of the invention, the processing unit of the first media processing device is a print unit that prints a receipt; the predetermined string is a string that is not printed by the print unit; and the interpreting unit determines if a string that is not printed by the print unit is included in the text data received by the first connection unit.

The first media processing device that prints text based on text data according to this aspect of the invention detects a predetermined string in text data related to the printed characters, and changes the operating mode. As a result, the POS terminal can change the operating mode if the POS terminal has a function that also sends text data related to the text to print with a command instructing the first media processing device to print. Use of first and second media processing devices can therefore be controlled without changing the POS terminal application or command set. Furthermore, because the string included in the text data is a string that is not printed by the print unit, this string can be differentiated from the text data to be printed, and operating errors caused by detection errors are prevented.

In a POS system according to another aspect of the invention, the media processing unit of the second media processing device is a second print unit that prints a receipt; the first media processing device transmits the data from the second connection unit when the control unit changes to the second operating mode; and the second media processing device receives the data by the receiving unit and prints a receipt by the second print unit.

In the POS system according to this aspect of the invention, the POS terminal can change the printing operation between the first and second media processing devices, and can print a receipt from the first media processing device and print a receipt from the second media processing device. As a result, the same printout can be output from the desired device according to current conditions.

A media processing device according to another aspect of the invention has a processing unit that processes media, a first connection unit that receives a command sent from a host computer, a second connection unit that sends a command received by the first connection unit to an external processing device that performs a same process as the processing unit, and a control unit that switches based on a command received by the first connection unit between controlling executing a process with the processing unit, and controlling sending the command by the second connection unit to the external processing device. When the command received by the first connection unit is a command executed by the processing unit, the control unit controls the processing unit to execute the command. When the command is a command other than a command executed by the processing unit, the control unit controls the second connection unit to send the command to the external processing device.

The media processing device according to another aspect of the invention can receive a command sent from the host computer and process media with the processing unit based on the received command, and sends the command to an external processing device if the received command is not a command that can be executed by the processing unit. In other words, the media processing device according to this aspect of the invention executes the command when an executable command is received, and passes a command that cannot be executed to an external processing device. As a result, commands that can be executed by the media processing device are executed by the media processing device, and other commands are executed by the external processing device. The host computer can therefore appropriately use the media processing device and external processing device differently without executing control matched to the functions that can be performed by the media processing device.

In addition to the first connection unit that connects to the host computer, the media processing device according to another aspect of the invention has a second connection unit that connects to an external processing device. As a result, the host computer can output commands in the same way as when one media processing device is connected. A special function or software configuration is therefore not needed in the host computer in order to use a plurality of processing devices. For example, a host computer can be used without modification.

A media processing device according to another aspect of the invention preferably also has a storage unit that stores a condition for executing a command received by the first connection unit on the processing unit, or sending the received command by the second connection unit to the external processing device. When the condition stored in the storage unit is met, the control unit sends the command received by the first connection unit through the second connection unit to the external processing device even if the command received by the first connection unit is a command executed by the processing unit.

In this aspect of the invention, the media processing device sends the command received from the host computer to the external processing device when the stored condition is met even if the command received from the host computer is a command that can be executed by the processing unit. In other words, functions that can be executed by the media processing device can also be executed on the external processing device. The media processing device and external processing device can thus be appropriately used in various ways.

Further preferably, the media processing device has a setting unit that sets the condition.

This aspect of the invention enables using the media processing device and external processing device as desired because the condition for the media processing device to send a command to the external processing device can be defined.

Another aspect of the invention is a POS system including: a POS terminal that transmits a command, a first media processing device, and a second media processing device. The first media processing device includes a processing unit that performs a first process on a recording medium; a first connection unit that receives a command transmitted from the POS terminal; a control unit that controls executing the command by the processing unit when the command received by the first connection unit is a command executed by the processing unit, and controls transmitting the command when the command is a command other than a command executed by the processing unit; and a second connection unit that transmits the command when controlled to transmit the command. The second media processing device includes a receiving unit that connects to the second connection unit of the first media processing device and receives a command transmitted from the second connection unit; and a media processing unit that performs a process common to the processing unit of the first media processing device based on the command received by the receiving unit.

In the POS system according to this aspect of the invention, the first media processing device can receive commands output from the POS terminal and process media with the processing unit based on the received commands, and can send the command to the second media processing device for processing by the second media processing device, for example, if the received command is not a command executed by the processing unit. As a result, the POS terminal can output commands, and the first and second media processing devices can distribute and process the commands appropriately based on the functions that each device can execute. The first and second media processing devices can therefore be appropriately used for different purposes without the POS terminal applying control matching the functions that the first and second media processing devices can perform.

In addition to the first connection unit that connects to the POS terminal, the first media processing device preferably also has a second connection unit that connects to the second media processing device. The POS terminal can therefore output commands in the same way as when the POS terminal controls the first media processing device, and the functions and software of the POS terminal do not need to be specially configured to use plural processing devices. For example, an existing POS terminal can be used without modification.

In a POS system according to another aspect of the invention, the first media processing device includes a storage unit that stores a condition for executing a command received by the first connection unit on the processing unit, or sending the received command by the second connection unit to the external processing device; and when the condition stored in the storage unit is met, the control unit sends the command received by the first connection unit through the second connection unit to the external processing device even if the command received by the first connection unit is a command executed by the processing unit.

In this aspect of the invention, the first media processing device sends the command received from the host computer to the second media processing device when the stored condition is met even if the command received from the POS terminal is a command that can be executed by the processing unit. In other words, functions that can be executed by the first media processing device can also be executed on the second media processing device. The first and second media processing devices can thus be appropriately used in various ways.

In a POS system according to another aspect of the invention, the second media processing device includes a second media processing unit that performs a different process than the processing unit of the first media processing device.

In the POS system according to this aspect of the invention the second media processing device can execute a different process than the first media processing device, and a command that is not executed by the first media processing device is sent to the second media processing device, which then performs a different process than the first media processing device according to the command. Whether the first media processing device executes a process or the second media processing device executes a process can therefore be changed based on the content of the process called by the command sent from the POS terminal. The first and second media processing devices can therefore be used differently according to the executed process.

The invention thus enables a host computer to appropriately use a plurality of processing devices without executing control specific to the plural processing devices.

Other objects and attainments together with a fuller understanding of the invention will become apparent and appreciated by referring to the following description and claims taken in conjunction with the accompanying drawings.

DESCRIPTION OF EMBODIMENTS

Embodiment 1

Configuration of a POS System

Figure 1:
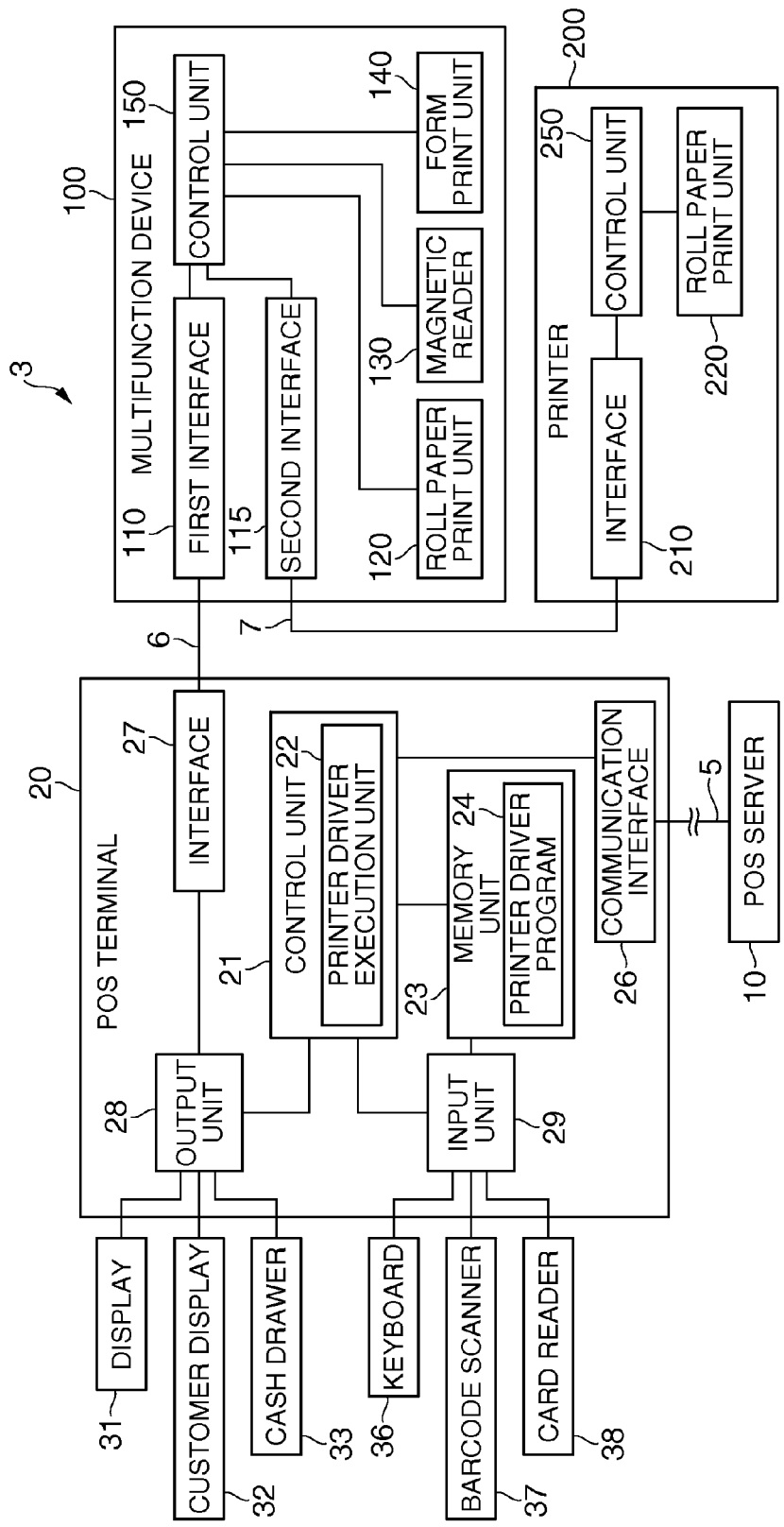
FIG. 1 is a function block diagram showing the configuration of a POS system according to a first embodiment of the invention.

A POS system according to a first embodiment of the invention is described below with reference to FIG. 1. FIG. 1 is a block diagram showing the configuration of a POS system according to the first embodiment of the invention. This POS system is typically installed in a retail store, for example, and used to register sales data, process transactions, and print receipts.

As shown in FIG. 1, the POS system 3 includes a POS terminal 20 (host computer) operated by an operator, a multifunction device 100 (media processing device, or first media processing device) connected to the POS terminal 20, and a printer 200 (external processing device, or second media processing device) connected to the multifunction device 100.

Connected to the POS terminal 20 are an operator display 31 that displays information for the operator, a customer display 32 that displays price and transaction information for the customer, a cash drawer 33 that holds cash and other payment instruments, a keyboard 36 that is used by the operator, a barcode scanner 37 used to read product barcodes, and a card reader 38 used to read magnetic information recorded on magnetic stripe cards such as credit cards and cash cards. The operator inputs product information by operating the keyboard 36 and using the barcode scanner 37 to read barcodes.

The POS terminal 20 then queries a POS server 10 based on the input product information. The POS server 10 searches a product master database based on the product information sent from the POS terminal 20, and returns product code, product name, price, and other product information from the master database to the POS terminal 20. The POS terminal 20 then displays product price information on the display 31 and customer display 32 based on the information returned from the POS server 10. When this process is completed for all products purchased in a transaction, the operator executes a transaction process by operating the keyboard 36, for example, and makes change from the cash drawer 33 as may be necessary. The POS terminal 20 then controls the multifunction device 100 or printer 200 to print and output a receipt.

The multifunction device 100 has a function for printing receipts on roll paper used as a recording medium. The multifunction device 100 also has a magnetic reader function for reading information magnetically recorded on checks and other forms, and a validation function for printing that a check or other form was used, for example. When a customer uses a check for payment in a sales transaction, the operator sets the check in the multifunction device 100 to read the magnetic information from the check. The multifunction device 100 then reads the magnetic information from the check and completes validation printing. The POS terminal 20 completes transaction processing based on the information read by the multifunction device 100.

The printer 200 has a function for printing receipts from roll paper. The multifunction device 100 and printer 200 could be thermal printers that print receipts on thermal roll paper, or serial dot impact or inkjet printers that print on plain roll paper.

The POS terminal 20 also has a control unit 21 that controls parts of the POS terminal 20. The control unit 21 includes CPU, RAM, ROM, and other peripheral circuits not shown, and runs a program stored in a memory unit 23. The control unit 21 includes a printer driver execution unit 22 that executes a printer driver program 24 stored in the memory unit 23.

The printer driver execution unit 22 generates and sends print data for printing receipts and commands telling a printer connected to the interface 27 to print. The printer driver execution unit 22 executes a printer driver program 24 that is written for a printer or a specific device from a specific manufacturer. As a result, the commands and print data generated by the printer driver execution unit 22 are print data and commands in the command set of a printer from a specific manufacturer or a specific model.

As shown in FIG. 1, the POS terminal 20 includes an output unit 28 with connectors (not shown in the figure) to which the operator display 31, customer display 32, and cash drawer 33 are connected. The output unit 28 outputs display data from the output unit 28 to the display 31 and customer display 32 as controlled by the control unit 21. The output unit 28 also outputs to the cash drawer 33 a signal that opens the cash drawer 33 as controlled by the control unit 21. The output unit 28 could also have a function for detecting the state (open or closed) of the cash drawer 33, and outputting the result to the control unit 21.

An interface 27 to which an external printer is connected is also connected to the output unit 28. The interface 27 has a connector (not shown in the figure) conforming to a particular standard such as USB, RS-232C, or Ethernet (R), and connects to a printer by a cable connected to this connector.

The interface 27 could also be a wireless communication interface enabling connecting a printer through a wireless connection. Examples of the wireless communication standard include IEEE 802.11, wireless USB, Bluetooth (R), and UWB. In this embodiment of the invention the interface 27 is connected to the multifunction device 100 through a cable 6. The POS terminal 20 and multifunction device 100 are connected 1:1.

The POS terminal 20 has a communication interface 26 connected to a communication line 5, and is connected to the POS server 10 through the communication interface 26. The communication interface 26 may include an Ethernet LAN interface, or a modem or other communication interface circuit.

The multifunction device 100 includes a first interface 110 (first connection unit) that connects to an external device, and a second interface 115 (second connection unit). The first interface 110 connects to the POS terminal 20 through the cable 6. The second interface 115 connects to the printer 200 through another cable 7. The first interface 110 connects 1:1 to the POS terminal 20, and the second interface 115 connects 1:1 to the printer 200.

The multifunction device 100 includes a control unit 150. The control unit 150 includes, for example, a CPU, RAM, ROM, and nonvolatile memory such as an EEPROM or flash memory device (not shown in the figure). The control unit 150 executes a program stored in nonvolatile storage to control other parts. This program could be firmware for operating the multifunction device 100.

The multifunction device 100 includes a roll paper print unit 120 (processing unit), a magnetic reader 130, and a form print unit 140 that operate as control led by the control unit 150. More specifically, the multifunction device 100 is a multifunction device with a plurality of functions including a function for printing receipts R, a function for reading magnetic information from forms, and a form printing function.

The control unit 150 exchanges data with the POS terminal 20 through the first interface 110, and exchanges data with the printer 200 through the second interface 115.

Not shown in the figures, the roll paper print unit 120 has a printhead for printing text and images on roll paper, a conveyance mechanism for conveying the roll paper, a cutter mechanism for cutting the roll paper, and detectors for detecting if roll paper is present and detecting the leading end of the roll paper. The roll paper print unit 120 prints on roll paper as controlled by the control unit 150, and outputs receipts R.

The magnetic reader 130 reads information magnetically recorded on checks and other forms that are loaded by the operator. Though not shown in the figures, the magnetic reader 130 also has a conveyance mechanism that conveys the forms, and an MICR head that reads information (such as the MICR line) magnetically recorded on the conveyed form.

The form print unit 140 prints text indicating that a form has been processed, for example, on the form that is read by the magnetic reader 130. The form print unit 140 has a printhead not shown. The printhead is disposed to a position past which the form is conveyed by the conveyance mechanism of the magnetic reader 130, and prints on the conveyed form.

The printer 200 is a simple printer with a function for printing receipts R. The printer 200 has an interface 210 (receiving unit) connected to the multifunction device 100 through a cable 7, a roll paper print unit 220 (media processing unit) including a printhead that prints on the roll paper, and a control unit 250 that controls these other parts. The interface 210 is a wired interface with a connector (not shown in the figure) or a wireless interface conforming to the first interface 110 or second interface 115 described above. The control unit 250 exchanges data with the multifunction device 100 through the interface 210.

Configuration of the Media Processing Device

Figure 2:
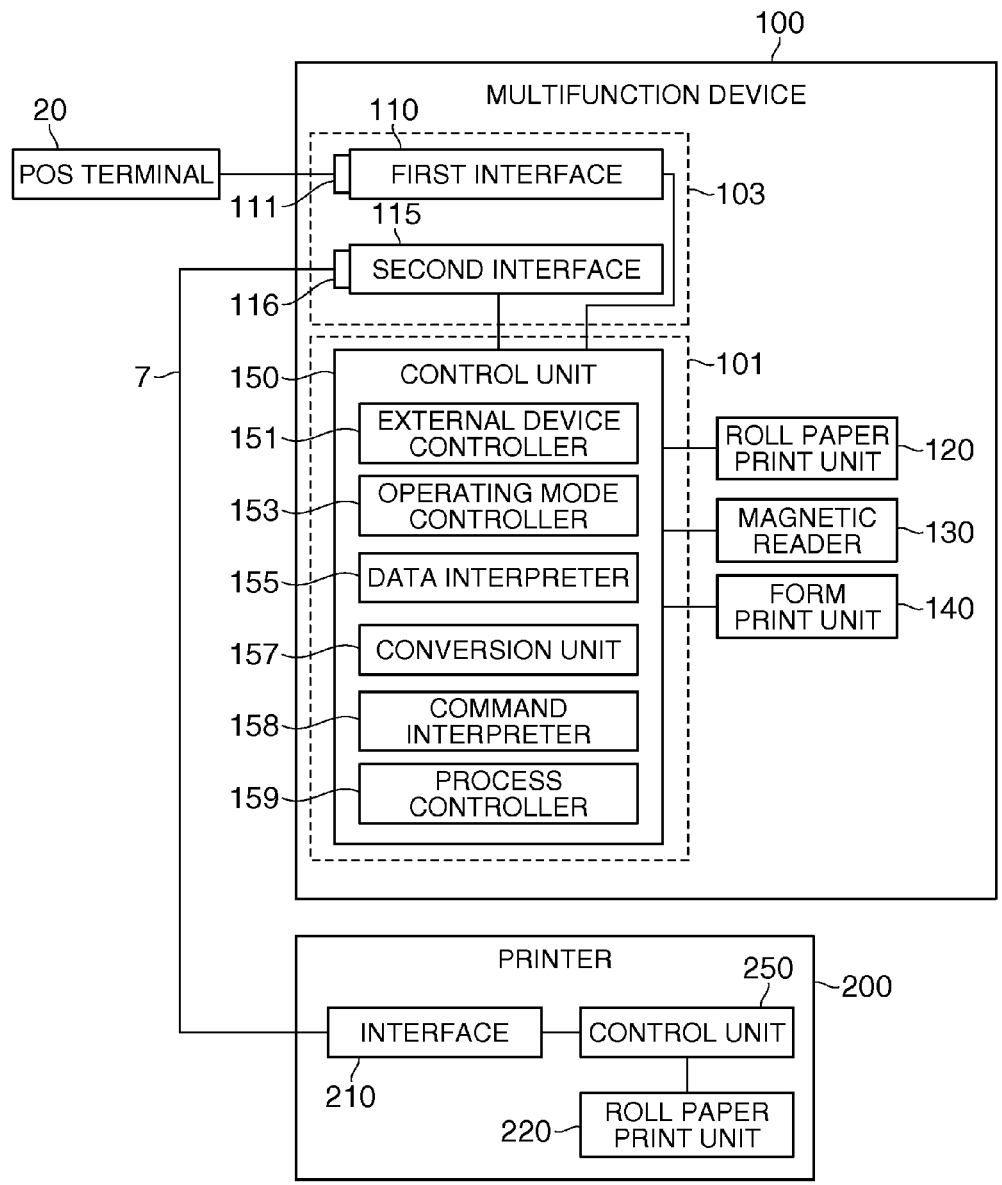
FIG. 2 is a function block diagram showing the configuration of a multifunction device in detail.

The configuration of the multifunction device used as an example of a media processing device is described below with reference to FIG. 2. FIG. 2 is a function block diagram of the POS system 3 showing the configuration of the multifunction device 100 in detail.

As shown in FIG. 2, the multifunction device 100 has a main circuit board 101 containing a CPU and other components for controlling parts of the multifunction device 100, and an interface board 103 disposed separately from the main circuit board 101.

The interface board 103 is connected to the main circuit board 101 through a detachable bus (not shown in the figure), for example, and is removably installed in the multifunction device 100. The first interface 110 and second interface 115 are mounted on the interface board 103, and the control unit 150 is mounted on the main circuit board 101. The main circuit board 101 is also connected to the roll paper print unit 120, magnetic reader 130, and form print unit 140.

The first interface 110 has a connector 111 that can connect to the cable 6, and the second interface 115 has a connector 116 that can connect to the other cable 7. These connectors 111, 116 are separately disposed to the interface board 103. In one implementation, the connectors 111, 116 are disposed side by side exposed from the back of the multifunction device 100. The first interface 110 and second interface 115 can communicate separately of each other.

The connectors 111, 116 are connectors that conform to a particular standard such as USB, RS-232C, or Ethernet (R), and can connect to a compatible cable 6, 7.

Alternatively, the first interface 110 and second interface 115 could be wireless communication interfaces enabling connecting to the POS terminal 20 or printer 200 through a wireless connection. Examples of the wireless communication standard include IEEE 802.11, wireless USB, Bluetooth (R), and UWB.

The control unit 150 operates as a external device controller 151, operating mode controller 153, data interpreter 155 (interpreting unit), conversion unit 157, command interpreter 158, and process controller 159 by means of the CPU mounted on the main circuit board 101 running specific programs.

The external device controller 151 communicates with the device connected to the second interface 115, and determines the type of device (multifunction device or printer), model name, manufacturer, the command set compatible with the device (type of commands), and functions that the device can handle, for example. In this embodiment the external device controller 151 determines at least the types of processes that the device connected to the second interface 115 can execute. Preferably, the external device controller 151 determines the command set that the device connected to the second interface 115 uses.

The method whereby the command set is identified could include sending data querying the command set through the second interface 115 and deciding the command set based on the received responses, or identifying the command set of the device by determining the manufacturer or model name of the device connected to the second interface 115, for example. Because a printer 200 is connected to the second interface 115 in this embodiment, the external device controller 151 determines the command set used by the printer 200.

The operating mode controller 153 controls changing the operating mode of the multifunction device 100. When the POS terminal 20 outputs a command for a printing operation, the multifunction device 100 can operate in a first mode in which the multifunction device 100 prints, or a second mode in which the printer 200 is driven to print. The first mode and second mode are selected exclusively.

In other words, in the first mode the multifunction device 100 executes all commands that are received through the first interface 110 and relate to processes that can be executed by the multifunction device 100.

In the second mode, the multifunction device 100 passes commands that are received through the first interface 110 and are related to processes that can be executed by the device connected to the second interface 115 through the second interface 115 to the connected device. The multifunction device 100 executes commands related to processes that cannot be executed by the device connected to the second interface 115.

When a command for printing is received through the first interface 110 in the first mode, the multifunction device 100 prints with the roll paper print unit 120 based on the print data received with the command.

When a command for printing is received in the second mode through the first interface 110, the multifunction device 100 outputs the command and the print data received with the command from the second interface 115. The printer 200 then receives the print data and the print command through the interface 210, and prints with the roll paper print unit 220.

Switching between the first mode and second mode occurs when, for example, a text command is detected by the data interpreter 155 described below. A configuration in which the operating mode controller 153 changes the operating mode when the first interface 110 receives a command defined as a command to change the operating mode of the multifunction device 100 is also conceivable.

Further alternatively, a physical switch (not shown in the figure) could be disposed to an outside panel of the multifunction device 100, and the operating mode controller 153 could change the operating mode when operation of this switch is detected.

Further alternatively, an operating panel (not shown in the figure) could be disposed to the multifunction device 100, and the operating mode controller 153 could change the operating mode based on operation of this operating panel. In this implementation, an indicator (not shown in the figure) that indicates the current operating mode, or a display, could also be disposed to the operating panel.

The data interpreter 155 interprets the text data contained in the print data received through the first interface 110, and determines if a text command is contained in the text data. A text command is a command contained in print data output by the POS terminal 20. The print data includes text data for printing text, and the text data is a string of text characters and symbols. The text characters and symbols contained in the text data are printed on the receipt R and seen by the customer, and therefore typically constitute human-readable content. As a result, strings that do not contain specific meaning as words or symbols (including situations in which specific meaning is not represented by the string) are therefore not printed. For example, the string "$10" expresses a monetary value. However, the string "#1122" is a string with no meaning unless a specific meaning has been assigned to the hash mark (#) symbol. Because strings with no meaning are not printed on the receipt R, they can be used as commands that can be interpreted by the multifunction device 100. Command that are thus sent to the multifunction device 100 as part of the text data contained in the print data are referred to as "text commands" herein.

A specific example of a text command is described next. In this example the string "#1122" is predefined as a command that tells the multifunction device 100 to change the operating mode. This predefined command is stored in the nonvolatile memory (not shown in the figure) of the control unit 150. The data interpreter 155 extracts text date from the print data received through the first interface 110, and looks for the string #1122 in the text data. If this string #1122 is found, the data interpreter 155 tells the operating mode controller 153 that a command to change the operating mode was detected. As a result, the operating mode controller 153 switches from the current operating mode to the other operating mode.

Text commands are output as part of the print data. As a result, new commands can be added without changing the command set (command language) used by the POS terminal 20. More specifically, an application program that outputs print data to the printer driver program 24 generates the text data contained in the print data. The printer driver program 24 converts the print data generated by the application program to the data format used by the multifunction device 100, and outputs the converted data with a print command. Therefore, if the application program outputs print data containing a text command, the multifunction device 100 can operate according to the text command even if the printer driver program 24 does not recognize the text command. Desirable commands related to multifunction device 100 operation can therefore be added without changing the content of the printer driver program 24 run by the POS terminal 20.

If a text command is detected in the print data received by the first interface 110, the data interpreter 155 deletes the text command and generates new print data. This prevents printing meaningless strings on the receipt R. The data interpreter 155 deletes text commands from the print data in both the first and second modes.

The conversion unit 157 converts the command received by the first interface 110 to a command of the same meaning in a different command set. As described above, the POS terminal 20 generates and outputs commands in a specific command set through a function of the printer driver program 24. The command set may vary according to the manufacturer and model of the device, including the multifunction device 100 and the printer 200. The command set output by the POS terminal 20 and the command set that can be executed by the multifunction device 100 and/or the printer 200 may therefore differ.

The conversion unit 157 stores a table defining the correlation between commands in at least one command set and commands in another command set. The control unit 150 could store the table relating the command set of commands output by the POS terminal 20 and the command set that can be executed by the multifunction device 100. The control unit 150 could also store a table relating the command set of commands output by the POS terminal 20 and the command set that can be executed by the printer 200.

If a command received by the first interface 110 is not a command in a command set that can be executed by the multifunction device 100, the conversion unit 157 converts the command to a command in the command set that can be executed by the multifunction device 100. As a result, the multifunction device 100 can execute commands received by the first interface 110.

When operating in the second mode and a command received by the first interface 110 is not a command in the command set executable by the printer 200, the conversion unit 157 converts the command to a command in the command set executable by the printer 200.

The external device controller 151 can identify commands that are executable by the printer 200. The commands output by the POS terminal 20 can therefore be executed in both the first mode and the second mode even if the command sets of the POS terminal 20 and the multifunction device 100 and/or printer 200 are not the same. As a result, if a printer in the POS system 3 is replaced by a multifunction device 100 or printer 200 of a different make or model, the multifunction device 100 or printer 200 can still be operated without changing the printer driver program 24.

When converting a command received by the first interface 110 to a command compatible with the printer 200, the conversion unit 157 may also change the content of the command or the content of the print data. For example, at least one of the printing parameters of the printer addressed by the printer driver program 24, such as the resolution of the printhead, the line feed distance, font size, font type, kerning, left and right margins of the roll paper, and the roll paper size, may differ from those of the roll paper print unit 120 of the multifunction device 100, or from those of the roll paper print unit 220 of the printer 200. Printing parameters may also differ between the roll paper print unit 120 and the roll paper print unit 220.

In this situation the conversion unit 157 changes the content of the commands and print data so that the same or similar printing results can also be achieved with a printer having different print parameters. For example, the conversion unit 157 may change commands or parameters, including the printing position command, the print margin command, line feed command, font selection command, or kerning command, contained in the commands received by the first interface 110 so that the roll paper print unit 120 produces the same or substantially the same printout as the printout produced by a printer that is compatible with the printer driver program 24. The conversion unit 157 could also convert the pixel count of image data contained in the print data. The conversion unit 157 also converts commands and parameters contained in the commands received by the first interface 110, or the pixel count of image data contained in the print data, so that the roll paper print unit 220 produces the same or similar results as a printer that is compatible with the printer driver program 24. As a result, the same or substantially the same printout can be produced using the multifunction device 100 and the printer 200 without modifying the software running on the POS terminal 20.

The command interpreter 158 interprets commands received by the first interface 110 and identifies the functions corresponding to the received commands. For example, the command interpreter 158 determines if a received command is a command related to a function of the roll paper print unit 120, a command related to a function of the magnetic reader 130, or a command related to a function of the form print unit 140.

If the command received by the first interface 110 is a command related to a function of the magnetic reader 130 or form print unit 140, the command interpreter 158 executes the received command using the process controller 159 described below.

If the command received by the first interface 110 is a command related to a function of the roll paper print unit 120, the command interpreter 158 determines the operating mode of the multifunction device 100. If the operating mode of the multifunction device 100 is the first mode, the command interpreter 158 causes the process controller 159 to execute commands related to the roll paper print unit 120. If the operating mode of the multifunction device 100 is the second mode, the command interpreter 158 sends the commands related to the roll paper print unit 120 through the second interface 115 to the printer 200. If the command received by the first interface 110 accompanies print data, the command interpreter 158 outputs the command and the print data from the second interface 115.

The process controller 159 executes commands received by the first interface 110 and drives the roll paper print unit 120, magnetic reader 130, and form print unit 140 to print a receipt R, read magnetic information and print on a form.

Operation of the Media Processing Device

Figure 3:
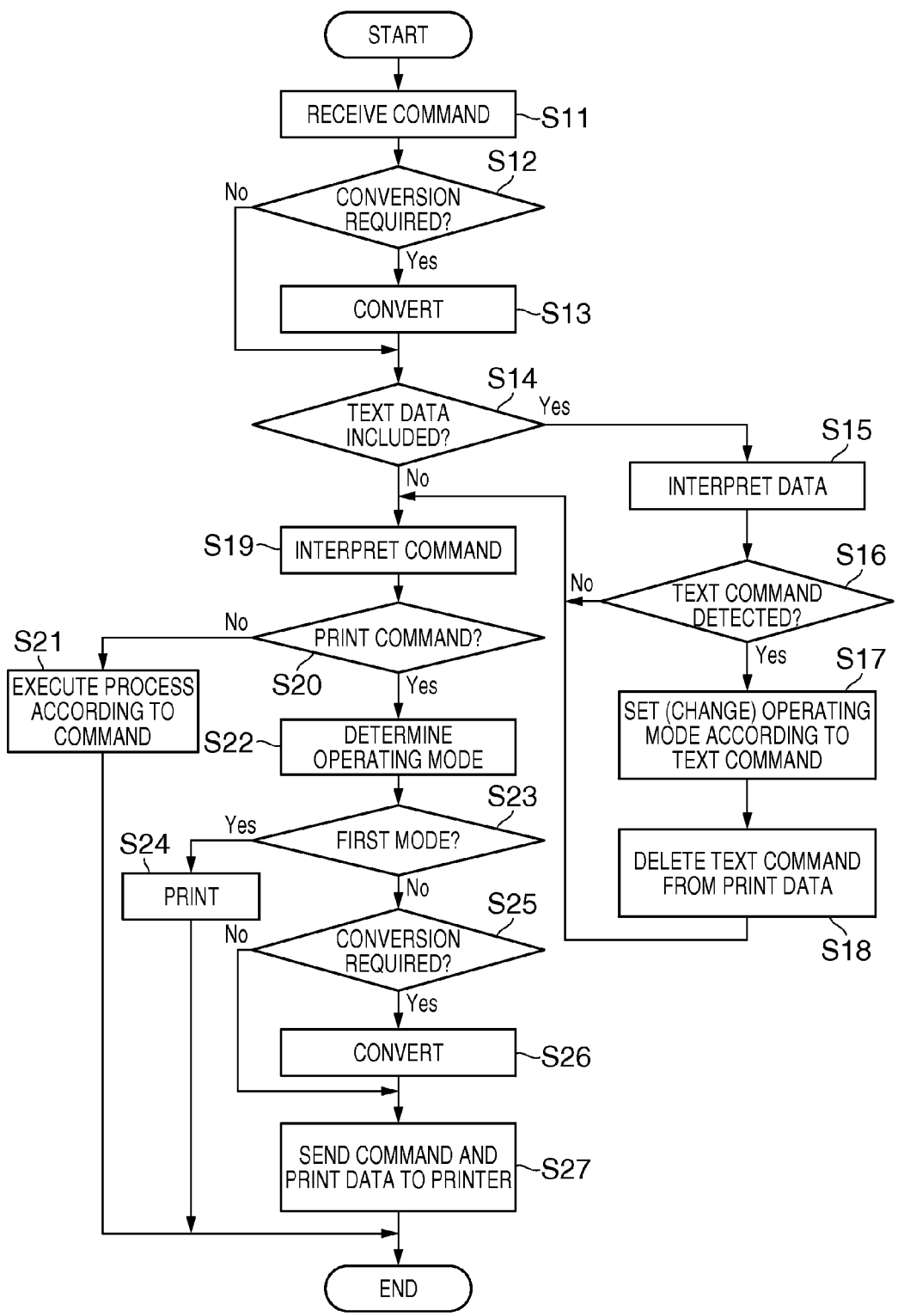
FIG. 3 is a flow chart showing the operation of the multifunction device.

The operation of a multifunction device as an example of a media processing device is described next with reference to FIG. 3. FIG. 3 is a flow chart showing the operation of the multifunction device 100.

As shown in FIG. 3, when the control unit 150 detects that a command was received by the first interface 110 (step S11), the conversion unit 157 determines if the received command must be converted (step S12). If the received command is different from the commands in the command set used by the multifunction device 100, the conversion unit 157 determines that command conversion is required (step S12 returns YES). In this event the conversion unit 157 converts the received command to a compatible command in the command set of the multifunction device 100 (step S13). The conversion unit 157 does not convert the command if command conversion is determined unnecessary (step S12 returns NO).

The data interpreter 155 then determines if text data was received with the command through the first interface 110 (step S14). If text data was received (step S14 returns YES), the data interpreter 155 interprets the received text data (step S15) and searches for a text command (step S16). If a text command is contained in the received text data (step S16 returns YES), the data interpreter 155 outputs the text command to the operating mode controller 153. The operating mode controller 153 then executes the process of changing (setting) the current operating mode to the other operating mode (step S17).

The data interpreter 155 then generates new text data by removing the text command output to the operating mode controller 153 from the received text data (step S18), and goes to the next step S19.

If a text command is not contained in the received text data (step S16 returns NO), the data interpreter 155 goes directly to step S19.

In step S19 the command interpreter 158 interprets the received command, and determines if the received command is a print command (step S20). If the received command is not a print command (step S20 returns NO), the command interpreter 158 outputs the command to the process controller 159, and the process controller 159 controls the magnetic reader 130 or form print unit 140 to execute the process called by the command (step S21).

If the received command is a print command (step S21 returns YES), the data interpreter 155 determines the operating mode set by the operating mode controller 153 (step S22). If the operating mode is the first mode (step S23 returns YES), the data interpreter 155 outputs the command to the process controller 159, and the process controller 159 controls the roll paper print unit 120 to print according to the print command (step S24).

If the operating mode is set to the second mode (step S23 returns NO), the conversion unit 157 determines if command conversion is required (step S25). Because commands are sent to the printer 200 in the second mode, the conversion unit 157 determines that command conversion is required if the command received by the first interface 110 is not a command used by the printer 200 (step S25 returns YES).

In this event the conversion unit 157 converts the command to a command in the command set used by the printer 200 (step S26), and sends the print command and the print data to the printer 200 through the second interface 115 (step S27).

If command conversion is not required (step S25 returns NO), the conversion unit 157 outputs the command and the print data received through the first interface 110 from the second interface 115. Note that the print data sent by the second interface 115 in step S27 is the print data received by the first interface 110 or the print data left after text command removal in step S18.

As described above, a multifunction device 100 in a POS system 3 according to this first embodiment of the invention has a roll paper print unit 120 that processes roll paper as the medium; a first interface 110 that receives text data sent from a POS terminal 20; a second interface 115 connected to a printer 200; a data interpreter 155 that searches text data received by the first interface 110 for a predetermined string; and a control unit 150 that, based on the result from the data interpreter 155, changes to a first operating mode in which the roll paper print unit 120 executes the process, or a second operating mode in which the text data received by the first interface 110 is sent from the second interface 115 to the printer 200.

As a result, the multifunction device 100 can send commands and text data received from the POS terminal 20 to the printer 200 for processing by the printer 200, for example. The multifunction device 100 also switches between operating modes when a predetermined string is contained in the text data sent from the POS terminal 20. More specifically, the POS terminal 20 can change the operating mode of the multifunction device 100 by including a specific string in the text data sent with a command. As a result, the POS terminal 20 can easily change the operating mode of the multifunction device 100, and use the multifunction device 100 and printer 200 differently. In addition, changing the operating mode can be controlled without expanding a command or command set even when a command related to changing the operating mode is not contained in the application executed by the POS terminal 20 or the commands used by the multifunction device 100. There is, therefore, no need to change the POS terminal 20 application that outputs commands. For example, the application used on an existing POS terminal 20 can be used without modification.

The multifunction device 100 that prints text based on text data using a roll paper print unit 120 detects a predetermined string contained in text data related to the printed characters, and changes the operating mode. As a result, the POS terminal 20 can therefore change the operating mode if the POS terminal 20 has a function that also sends text data related to the printed text. Use of the multifunction device 100 and printer 200 can therefore be controlled without changing the POS terminal 20 application.

Yet further, when the predetermined string is detected by the data interpreter 155 in the text data, the control unit 150 executes the operating mode selected according to the predetermined string based on the text data remaining after removing the predetermined string from the text data received by the first interface 110. Because the string for changing the operating mode therefore has no affect on printing a receipt R, the POS terminal 20 can more appropriately differentiate using the multifunction device 100 and printer 200.

The multifunction device 100 also has a conversion unit 157 that converts a command received by the first interface 110 to a command used by the roll paper print unit 120 or printer 200. As a result, even if the multifunction device 100 or printer 200 is connected to a POS terminal 20 that uses different commands, the multifunction device 100 and printer 200 can be appropriately operated without modifying any commands output from the application run by the POS terminal 20.

Embodiment 2

POS System Configuration

Figure 4:
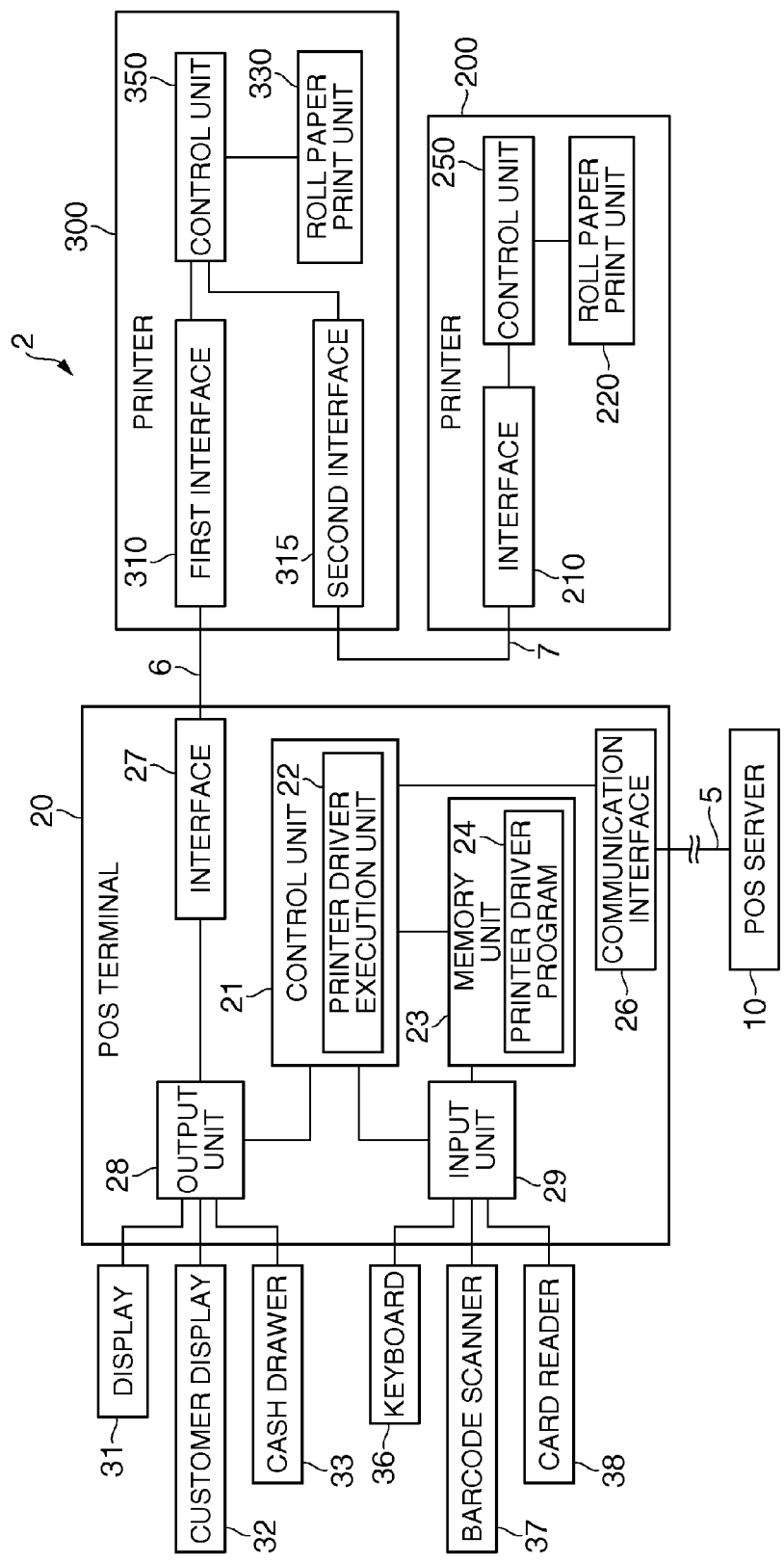
FIG. 4 is a function block diagram showing the configuration of a POS system according to a second embodiment of the invention.

A POS system according to a second embodiment of the invention is described next with reference to FIG. 4. FIG. 4 is a function block diagram showing the configuration of the POS system 2 according to the second embodiment of the invention. Like the POS system 3 described above, POS system 2 is a system that is installed in a retail store, for example, and used to register sales data, process transactions, and print receipts at the point of sale. Note that like parts in this and the first embodiment are identified by like reference numerals, and further description thereof is omitted.

As shown in FIG. 4, the POS system 2 includes a POS terminal 20, and two printers 200, 300. The two printers 200, 300 are connected in a so-called daisy chain with printer 300 (media processing device, first media processing device) connected to the POS terminal 20 and printer 200 connected to the first printer 300.

The POS system 2 according to the second embodiment of the invention thus uses a printer 200 instead of a multifunction device 100 in the POS system 3 according to the first embodiment of the invention. The input unit 29 therefore corresponds to a host computer, and the printer 200 corresponds to an external processing device and a second media processing device.

A printer 300 is connected through cable 6 to the interface 27 of the POS terminal 20 in this second embodiment. The POS terminal 20 and printer 300 are connected 1:1. Like printer 200, printer 300 has a function for printing a receipt R on roll paper used as the recording medium. Note that the printer 300 could be a thermal printer that prints a receipt R on thermal roll paper, or a serial dot impact printer or inkjet printer that prints on plain roll paper.

The printer 300 includes a first interface 310 (first connection unit) that connects to an external device, and a second interface 315 (second connection unit). The first interface 310 connects to the POS terminal 20 through the cable 6. The second interface 315 connects to the other printer 200 through another cable 7. The first interface 310 connects 1:1 to the POS terminal 20, and the second interface 315 connects 1:1 to the printer 200.

The printer 300 includes a control unit 350. The control unit 350 includes, for example, a CPU, RAM, ROM, and nonvolatile memory such as an EEPROM or flash memory device (not shown in the figure). The control unit 350 executes a program stored in nonvolatile storage to control other parts. This program could be firmware for operating the printer 300.

The control unit 350 exchanges data with the POS terminal 20 through the first interface 310, and exchanges data with the other printer 200 through the second interface 315. The control unit 350 also controls a roll paper print unit 330 (processing unit) and prints receipts R.

Not shown in the figures, the roll paper print unit 330 has a printhead for printing text and images on roll paper, a conveyance mechanism for conveying the roll paper, a cutter mechanism for cutting the roll paper, and detectors for detecting if roll paper is present and detecting the leading end of the roll paper. The roll paper print unit 330 prints on roll paper as controlled by the control unit 350, and outputs a receipt R.

The printer 300 is connected through cable 7 to the interface 210 of the printer 200, and the control unit 250 exchanges data with the printer 300 through the interface 210.

Configuration of the Media Processing Device

Figure 5:
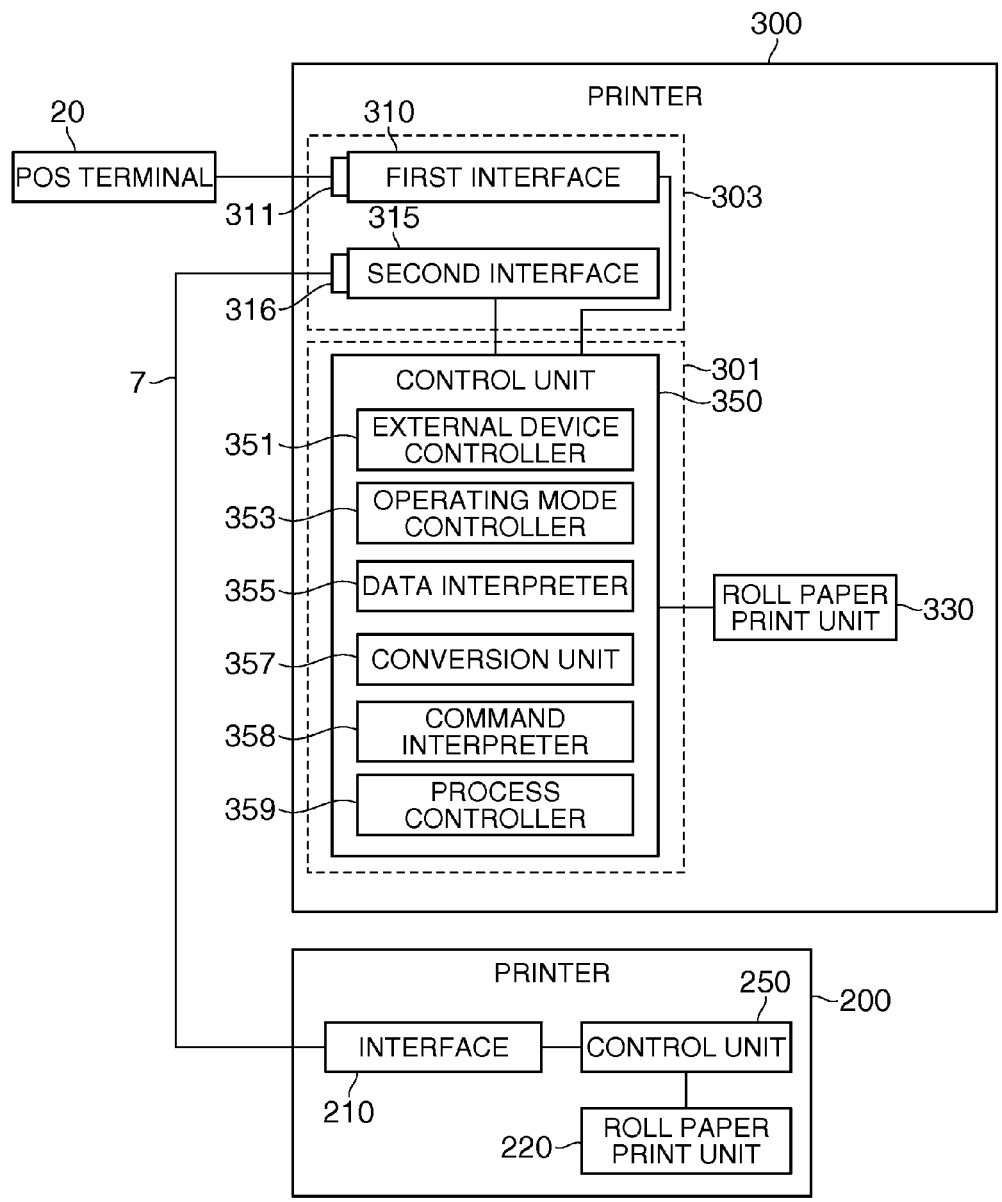
FIG. 5 is a function block diagram showing the configuration of a printer in detail.

The configuration of the printer used as an example of a media processing device in this embodiment is described below with reference to FIG. 5. FIG. 5 is a function block diagram of the POS system 2 showing the configuration of the printer 300 in detail.

As shown in FIG. 5, the printer 300 has a main circuit board 301 containing a CPU and other components for controlling parts of the printer 300, and an interface board 303 disposed separately from the main circuit board 301.

The interface board 303 is connected to the main circuit board 301 through a detachable bus (not shown in the figure), for example, and is removably installed in the printer 300. The first interface 310 and second interface 315 are mounted on the interface board 303, and the control unit 350 is mounted on the main circuit board 301. The main circuit board 301 is also connected to the roll paper print unit 330 of the printer 300.

The first interface 310 has a connector 311 that can connect to the cable 6, and the second interface 315 has a connector 316 that can connect to the other cable 7. These connectors 311, 316 are separately disposed to the interface board 303. In one implementation, the connectors 311, 316 are disposed side by side exposed from the back of the printer 300. The first interface 310 and second interface 315 can also communicate separately of each other.

Like the connectors 111, 116 (FIG. 2) described above, these connectors 311, 316 may be connectors conforming to a particular standard. Like the first interface 110 and second interface 115 described above, the first interface 310 and second interface 315 could also be wireless communication interfaces.

The control unit 350 operates as a external device controller 351, operating mode controller 353, data interpreter 355 (interpreting unit), conversion unit 357, command interpreter 358, and process controller 359 by means of the CPU mounted on the main circuit board 301 running specific programs.

The external device controller 351 functions identically to the external device controller 151. The external device controller 351 exchanges data with the device connected to the second interface 315, and determines the type of device, model name, manufacturer, the command set compatible with the device, and functions that the device can execute, for example.

The operating mode controller 353 functions identically to the operating mode controller 153. The control unit 350 can select and execute a first mode in which the printer 300 prints, or a second mode in which the printer 200 is driven to print.

In the first mode the printer 300 executes commands that are received through the first interface 310 and can be executed by the printer 300.

In the second mode, the printer 300 passes commands that are received through the first interface 310 and are related to processes that can be executed by the device connected to the second interface 315 through the second interface 315 to the connected device. The operating mode controller 353 controls switching between the first mode and second mode.

Switching between the first mode and second mode occurs when, for example, changing the operating mode is commanded by a text command detected by the data interpreter 355 described below.

Further alternatively, a physical switch (not shown in the figure) could be disposed to an outside panel of the printer 300, and the operating mode controller 353 could change the operating mode when operation of this switch is detected.

Further alternatively, an operating panel (not shown in the figure) could be disposed to the printer 300, and the operating mode controller 353 could change the operating mode based on operation of this operating panel. In this implementation, an indicator (not shown in the figure) that indicates the current operating mode, or a display, could also be disposed to the operating panel.

The data interpreter 355 acquires text data contained in the print data received through the first interface 310, interprets the text data, and determines if a text command is contained in the text data. A predetermined text command is stored, for example, in nonvolatile memory (not shown in the figure) of the control unit 350. When a text command is detected from the text data, the data interpreter 355 tells the operating mode controller 353 that a command instructing changing the operating mode was detected. As a result, the operating mode controller 353 changes the currently executing operating mode to another operating mode.

If a text command is detected in the print data received by the first interface 310, the data interpreter 355 deletes the text command and generates new print data. This prevents printing meaningless strings on the receipt R. The data interpreter 355 deletes text commands from the print data in both the first and second modes.

The conversion unit 357 converts the command received by the first interface 310 to a command of the same meaning in a different command set. For example, the conversion unit 357 stores a table defining the correlation between commands in at least one command set and commands in another command set, and converts commands based on this table.

If a command received by the first interface 310 is not a command in a command set that can be executed by the printer 300, the conversion unit 357 converts the command to a command in the command set that can be executed by the printer 300.

When operating in the second mode and a command received by the first interface 310 is not a command in the command set executable by the printer 200, the conversion unit 357 converts the command to a command in the command set executable by the printer 200.

As a result, if a printer in the POS system 2 is replaced by a printer 300 or printer 200 of a different make or model, the printer 300 or printer 200 can still be operated without changing the printer driver program 24.

Like the conversion unit 157, when converting a command received by the first interface 310 to a command compatible with the printer 200, the conversion unit 357 may also change the content of the command or the content of the print data. This enables producing the same or substantially the same printout from either printer 200, 300 without modifying POS terminal 20 software.

Like the command interpreter 158, the command interpreter 358 interprets commands received by the first interface 310 and identifies the functions corresponding to the received commands. For example, the command interpreter 358 determines if a received command is a command related to a function of the roll paper print unit 330, or a command related to another function. Commands related to functions other than printing include, for example, commands related to a function for reading magnetic information recorded on checks or other forms, and commands related to printing on manually inserted forms such as checks.

If the command received by the first interface 310 is a command related to a function other than a function of the roll paper print unit 330, the command interpreter 358 discards the command. This is because the command cannot be executed by printer 300 or printer 200.

If the command received by the first interface 310 is a command related to a function of the roll paper print unit 330, the command interpreter 358 determines the operating mode of the printer 300. If the operating mode of the printer 300 is the first mode, the command interpreter 358 causes the process controller 359 to execute commands related to the roll paper print unit 330.

If the operating mode of the multifunction device 300 is the second mode, the command interpreter 358 sends the commands related to the roll paper print unit 330 through the second interface 315 to the printer 200. If the command received by the first interface 310 accompanies print data, the command interpreter 358 outputs the command and the print data from the second interface 315.

The process controller 359 executes commands received by the first interface 310 and drives the roll paper print unit 330 to print a receipt R.

Operation of the Media Processing Device

Figure 6:
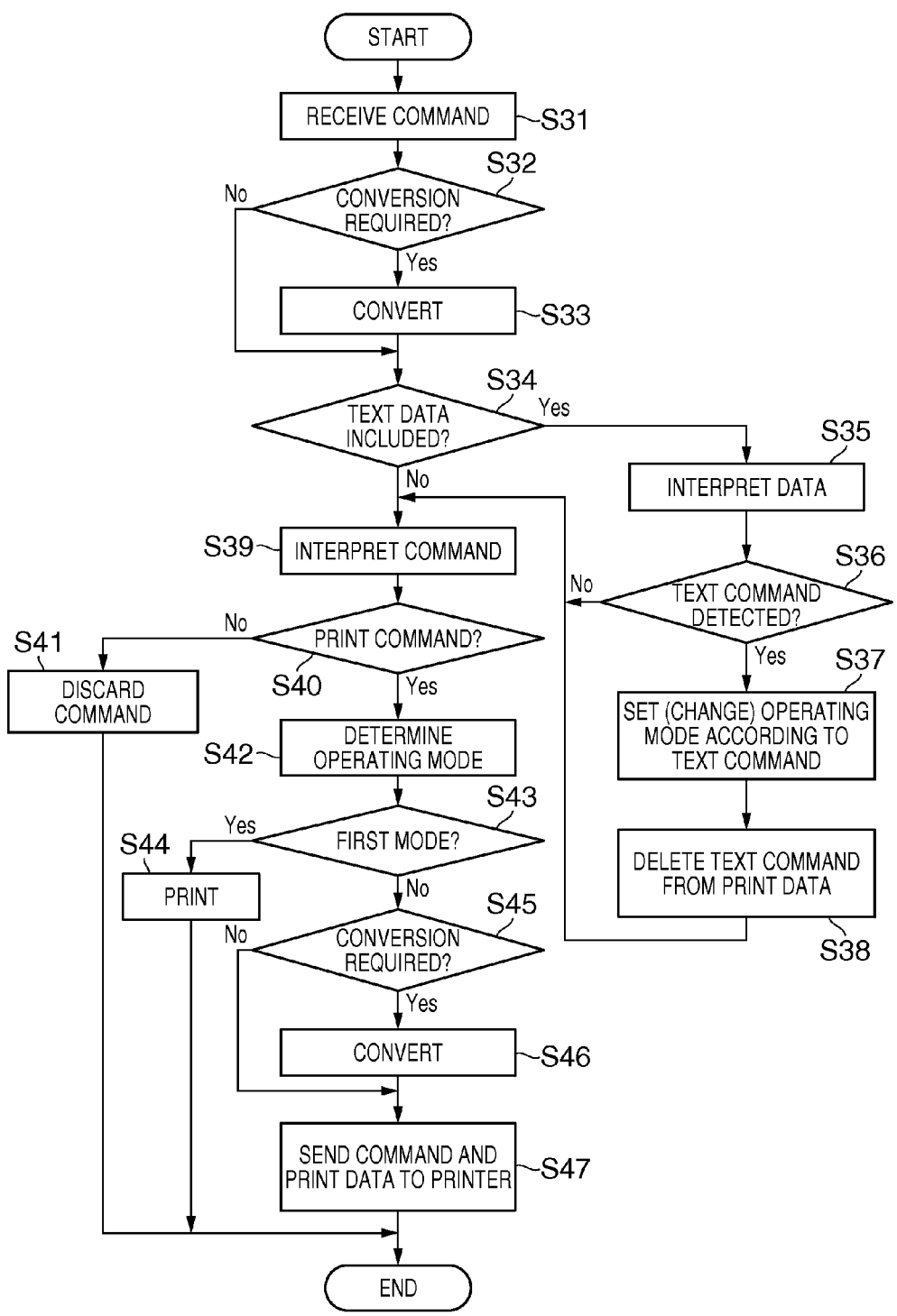
FIG. 6 is a flow chart of the operation of a printer according to the second embodiment of the invention.

The operation of the printer 300 as an example of a media processing device is described next with reference to FIG. 6. FIG. 6 is a flow chart showing the operation of the printer 300.

As shown in FIG. 6, when the control unit 350 detects that a command was received by the first interface 310 (step S31), the conversion unit 357 determines if the received command must be converted (step S32). If the received command is different from the commands in the command set used by the printer 300, the conversion unit 357 determines that command conversion is required (step S32 returns YES). In this event the conversion unit 357 converts the received command to a compatible command in the command set of the printer 300 (step S33). The conversion unit 357 does not convert the command if command conversion is determined unnecessary (step S32 returns NO).

The data interpreter 355 then determines if text data was received with the command through the first interface 310 (step S34). If text data was received (step S34 returns YES), the data interpreter 355 interprets the received text data (step S35) and searches for a text command (step S36). If a text command is contained in the received text data (step S36 returns YES), the data interpreter 355 outputs the text command to the operating mode controller 353. The operating mode controller 353 then executes the process of changing (setting) the current operating mode to the other operating mode (step S37).

The data interpreter 355 then generates new text data by removing the text command output to the operating mode controller 353 from the received text data (step S38), and goes to the next step S39.

If a text command is not contained in the received text data (step S36 returns NO), the data interpreter 355 goes directly to step S39.

In step S39 the command interpreter 358 interprets the received command, and then determines if the received command is a command instructing executing a process, and if the process to be executed is printing on roll paper (step S40).

Control commands that can be executed by the printer 300 are executed by the control unit 350 regardless of whether the command is related to printing on roll paper. More specifically, the control unit 350 immediately executes control commands such as commands from the POS terminal 20 requesting the printer 300 to return the printer status, commands instructing going to a sleep mode, commands for waking from the sleep mode, and commands instructing changing the operating mode, for example, regardless of the flow chart shown in FIG. 6.

If the received command is a command for executing a process (function) other than printing on roll paper (step S40 returns NO), the command interpreter 358 discards the command (step S41) and ends this process.

If the received command is a command related to the roll paper print function (step S41 returns YES), the data interpreter 355 determines the operating mode set by the operating mode controller 353 (step S42). If the operating mode is the first mode (step S43 returns YES), the data interpreter 355 outputs the command to the process controller 359, and the process controller 359 controls the roll paper print unit 330 to print according to the print command (step S44).

However, if the operating mode is set to the second mode (step S43 returns NO), the conversion unit 357 determines if command conversion is required (step S45). Because commands are sent to printer 200 in the second mode, the conversion unit 357 determines that command conversion is required if the command received by the first interface 310 is not a command used by the printer 200 (step S45 returns YES).

In this event the conversion unit 357 converts the command to a command in the command set used by the printer 200 (step S46), and sends the print command and the print data to the printer 200 through the second interface 315 (step S47).

If command conversion is not required (step S45 returns NO), the conversion unit 357 outputs the command and the print data received through the first interface 310 from the second interface 315. Note that the print data output by the second interface 315 in step S47 is the print data received by the first interface 310 or the print data left after text command removal in step S38.

As described above, a printer 300 in a POS system 2 according to the second embodiment of the invention includes a roll paper print unit 330; a first interface 310 that receives data transmitted from the POS terminal 20; a second interface 315 that sends text data received by the first interface 310 to another printer 200; a data interpreter 355 that looks for a predetermined string in the text data received by the first interface 310; and a control unit 350 that can switch operation between a first operating mode in which the roll paper print unit 330 executes a process, and a second operating mode in which text data received by the first interface 310 is sent through the second interface 315 to the other printer 200. As a result, the printer 300 can, for example, send text data received from a POS terminal 20 to another printer 200 for processing by the other printer 200.

The printer 300 changes between two operating modes when a predetermined string is contained in the text data sent from the POS terminal 20. In other words, the POS terminal 20 can change the operating mode of the printer 300 by including this predetermined string in the text data that is sent with a command to the printer 300. As a result, the POS terminal 20 can easily change the operating mode of the printer 300, and can use the printer 300 and printer 200 differently. In addition, changing the operating mode can be controlled without expanding a command or command set even when a command related to changing the operating mode is not included in the commands used by the POS terminal 20 or the printer 300. There is, therefore, no need to change the command-related software configuration of the POS terminal 20. An existing POS terminal 20 can therefore be used without modification.

A printer 300 that prints text with a roll paper print unit 330 based on text data can also change the operating mode by detecting a predetermined string contained in the text data related to the text to be printed. As a result, if the POS terminal 20 has a function for sending a command instructing printing and text data related to the text to print to the printer 300, the POS terminal 20 can change the operating mode. Printer 300 and printer 200 can therefore be used differently without changing the software configuration or command set of the POS terminal 20.

Yet further, when the predetermined string is detected by the data interpreter 355 in the text data, the control unit 350 executes the operating mode selected according to the predetermined string based on the text data remaining after removing the predetermined string from the text data received by the first interface 310. Because the string for changing the operating mode therefore has no affect on printing a receipt, the POS terminal 20 can more appropriately differentiate using printer 300 and printer 200.

The printer 300 also has a conversion unit 357 that converts a command received by the first interface 310 to a command used by the roll paper print unit 320 or printer 200. As a result, even if the printer 300 or printer 200 is connected to a POS terminal 20 that uses different commands, the printer 300 and printer 200 can be appropriately operated without modifying the command-related functions of the POS terminal 20.

The invention is described above with reference to a preferred embodiment thereof, but the invention is not limited thereto and can be modified and adapted in many ways without departing from the scope of the accompanying claims. Examples of such variations are described below.

For example, the effect of the invention can also be achieved with configurations that do not include the function of one or more of the external device controller 151, operating mode controller 153, data interpreter 155, conversion unit 157, command interpreter 158, and process controller 159 of the multifunction device 100 in the first embodiment described above. For example, in a device that connects to the second interface 115 and has information about the command set and types of processes that it can execute preset in the control unit 150, the printer 200 detection function of the external device controller 151 can be omitted.

Further alternatively, if the multifunction device 100 and printer 200 are compatible with the command set of the commands output by the POS terminal 20, the command conversion function of the conversion unit 157 can be omitted. Yet further alternatively, when commands that are received by the first interface 110 and then passed on from the second interface 115 are set individually or by corresponding function in the control unit 150, the command interpretation function of the command interpreter 158 can be omitted because the operating mode controller 153 can send the command from the second interface 115 when the received command is one of these defined commands. This also applies to the external device controller 351, operating mode controller 353, data interpreter 355, conversion unit 357, command interpreter 358, and process controller 359 of the printer 300 in the second embodiment.

Embodiment 3

POS System Configuration

Figure 7:
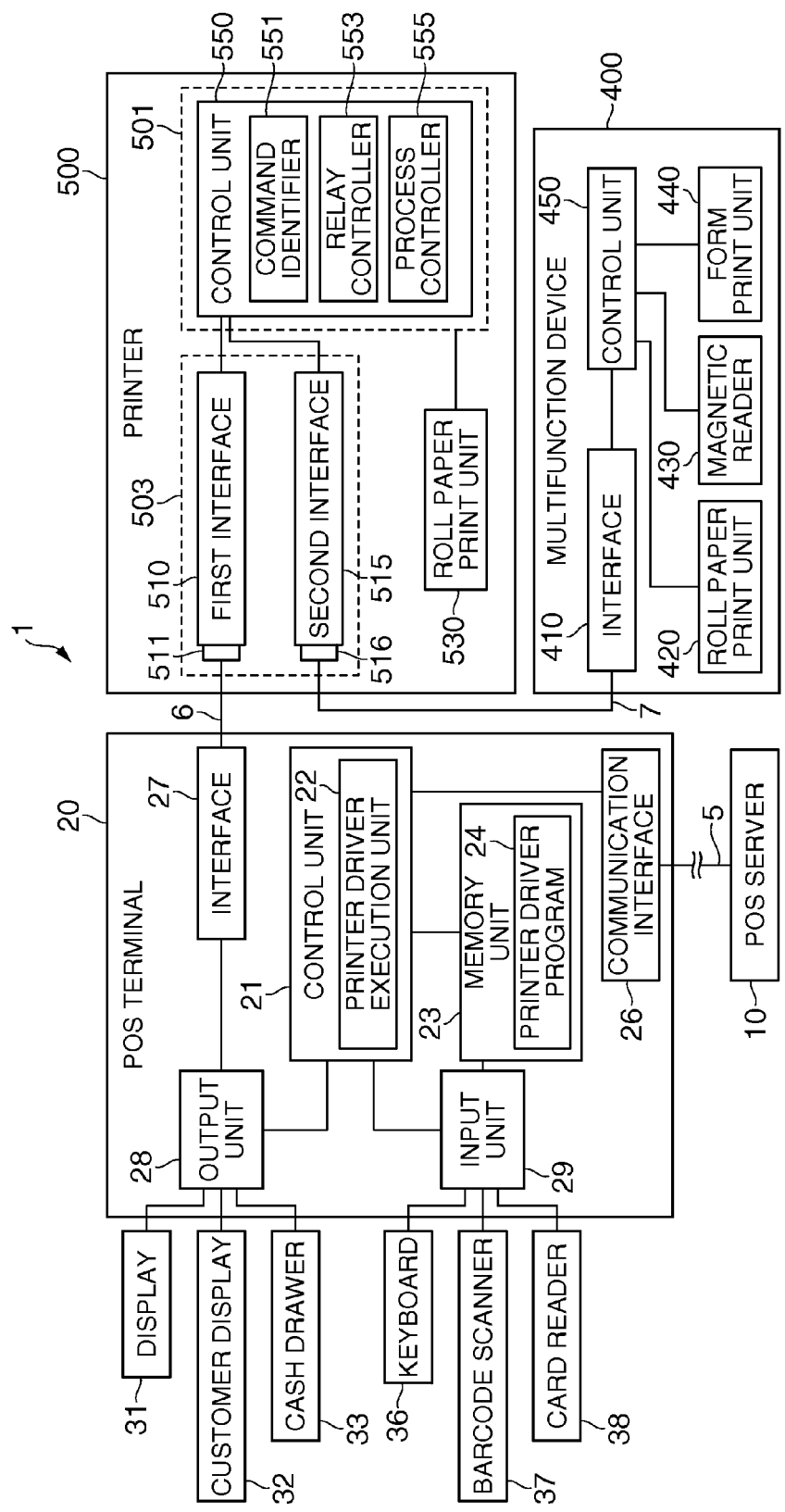
FIG. 7 is a function block diagram showing the configuration of a POS system according to a third embodiment of the invention.

A POS system according to a third embodiment of the invention is described next with reference to FIG. 7. FIG. 7 is a block diagram showing the configuration of the POS system 2 according to this embodiment. Like POS system 2 and POS system 3 described above, POS system 1 is a system that is installed in a retail store, for example, and used to register sales data, process transactions, and print receipts at the point of sale.

As shown in FIG. 7, the POS system 1 includes a POS terminal 20 (host computer) operated by an operator, a printer 500 (media processing device, first media processing device) connected to the POS terminal 20, and a multifunction device 400 (external processing device, second media processing device) connected to the printer 500. Note that like parts in this and the first and second embodiments are identified by like reference numerals, and further description thereof is omitted.

The printer 500 is a single function printer for printing receipts R on roll paper. The printer 500 prints and outputs a receipt R as controlled by the POS terminal 20. The printer 500 also has a function for relaying commands and data output by the POS terminal 20 to the multifunction device 400.

The multifunction device 400 has a printer function for printing on roll paper, a function for reading information recorded magnetically on checks and other forms, and a function for printing on the forms. The multifunction device 400 is connected to the POS terminal 20 through the printer 500. As a result, the multifunction device 400 operates based on commands and data passed from the printer 500.

Configured as in the first and second embodiments, the POS terminal 20 has an interface 27 to which an external printer is connected, and in this embodiment printer 500 is connected through a cable 6 to the interface 27. The POS terminal 20 and printer 500 are connected 1:1. The POS terminal 20 outputs commands and print data for printing out a receipt R.

The POS terminal 20 also has a control unit 21 that controls parts of the POS terminal 20, and in this embodiment the printer 500 prints based on commands and print data generated by the printer driver execution unit 22 of the control unit 21. The multifunction device 400 is also compatible with commands other than the print commands generated by the printer driver execution unit 22.

The printer 500 has a first interface 510 (first connection unit) that connects to an external device, and a second interface 515 (second connection unit). The first interface 510 connects to the POS terminal 20 through the cable 6. The second interface 515 connects to the multifunction device 400 through another cable 7. The first interface 510 connects 1:1 to the POS terminal 20, and the second interface 515 connects 1:1 to the multifunction device 400.

The printer 500 has a main circuit board 501 on which a CPU and other components for controlling parts of the printer 500 are mounted, and an interface board 503 disposed separately from the main circuit board 501.

The interface board 503 is connected to the main circuit board 501 through a detachable bus (not shown in the figure), for example, and is removably installed in the multifunction device 500. The first interface 510 and second interface 515 are mounted on the interface board 503, and the control unit 550 is mounted on the main circuit board 501. The main circuit board 501 is also connected to the roll paper print unit 530 disposed in the printer 500, and other parts such as an operating panel not shown.

The first interface 510 has a connector 511 that can connect to the cable 6, and the second interface 515 has a connector 516 that can connect to the other cable 7. These connectors 511, 516 are mounted separately on the interface board 503.

In one implementation, the connectors 511, 516 are disposed side by side exposed from the back of the printer 500. The first interface 510 and second interface 515 can communicate separately of each other.

The connectors 511, 516 are connectors that conform to a particular standard such as USB, RS-232C, or Ethernet (R), and can connect to a compatible cable 6, 7.

Alternatively, the first interface 510 and second interface 515 could be wireless communication interfaces enabling connecting to the POS terminal 20 or multifunction device 400 through a wireless connection. Examples of the wireless communication standard include IEEE 802.11, wireless USB, Bluetooth (R), and UWB.

The control unit 550 operates as a command identifier 551, relay controller 553, and process controller 555 by means of the CPU mounted on the main circuit board 501 running specific programs.

The command identifier 551 interprets a command received by the first interface 510, and determines if the received command is a command related to the roll paper print unit 530. If the command identifier 551 determines the command received by the first interface 510 relates to the roll paper print unit 530, the process controller 555 executes the received command. If the command identifier 551 determines the received command does not relate to the roll paper print unit 530, the relay controller 553 outputs the command to the multifunction device 400. Whether or not the received command relates to the roll paper print unit 530 can be determined, for example, by storing corresponding commands in ROM accessible by the control unit 550, and determining if the received command matches a stored command.

Of the commands received by the first interface 510, the relay controller 553 outputs the commands the command identifier 551 determines do not relate to the roll paper print unit 530 from the second interface 515. If print data for validation printing is added to the command, the relay controller 553 outputs the print data with the command from the second interface 515.

Of the commands received by the first interface 510, the process controller 555 executes the commands determined by the command identifier 551 to relate to the roll paper print unit 530. More specifically, the process controller 555 controls the roll paper print unit 530 to print a receipt R on roll paper based on the print command and print data received by the first interface 510.

The multifunction device 400 has an interface 410 connected to the POS terminal 20 through a cable 7, a roll paper print unit 420 (media processing unit) including a printhead that prints on the roll paper, and a control unit 450 that controls these other parts. The interface 410 is a wired interface with a connector (not shown in the figure) or a wireless interface like the first interface 510 or second interface 515 described above. The control unit 450 exchanges data with the printer 500 through the interface 410.

The multifunction device 400 has a roll paper print unit 420 (processing unit) that prints a receipt R on roll paper, a magnetic reader 430 (second media processing unit) that reads information magnetically recorded on a check or other form, and a form print unit 440 (second media processing unit) that prints validation information indicating the check or other form was used, as controlled by the 450. The multifunction device 400 is thus a multifunction device with a plurality of functions including a function for printing a receipt R, a function for reading magnetic information from a form, and a function for printing on a form.

Not shown in the figures, the roll paper print unit 420 has a printhead for printing text and images on roll paper, a conveyance mechanism for conveying the roll paper, a cutter mechanism for cutting the roll paper, and detectors for detecting if roll paper is present and detecting the leading end of the roll paper. The roll paper print unit 420 prints on roll paper as controlled by the control unit 450, and outputs a receipt R.

The magnetic reader 430 reads information magnetically recorded on checks and other forms that are loaded by the operator. Though not shown in the figures, the magnetic reader 430 also has a conveyance mechanism that conveys the forms, and an MICR head that reads information (such as the MICR line) magnetically recorded on the conveyed form.

The form print unit 440 prints text indicating that a form has been processed, for example, on the form that is read by the magnetic reader 430. The form print unit 440 has a printhead not shown. The printhead is disposed to a position past which the form is conveyed by the conveyance mechanism of the magnetic reader 430, and prints on the conveyed form.

When a customer uses a check in the transaction process, the operator sets the check in the multifunction device 400, operates the POS terminal 20, and reads the MICR line recorded on the check. This operation causes the POS terminal 20 to output a command instructing reading the MICR line recorded on the check, and a command for validation printing. These commands are output from the POS terminal 20 to the multifunction device 400 through the printer 500, and the printer 500 outputs them to the multifunction device 400.

The control unit 450 includes, for example, a CPU, RAM, ROM, and nonvolatile memory such as an EEPROM or flash memory device (not shown in the figure). The control unit 450 executes a program stored in nonvolatile storage to control other parts. This program could be firmware for operating the multifunction device 400.

The control unit 450 controls the magnetic reader 430 or form print unit 440 according to the commands received through the interface 410 to read the MICR line on the check or for validation printing. When the MICR line is read with the magnetic reader 430, the control unit 450 outputs the data captured from the read MICR characters from the interface 410. This read data is passed by the printer 500 to the POS terminal 20.

Operation of the Media Processing Device

Figure 8:
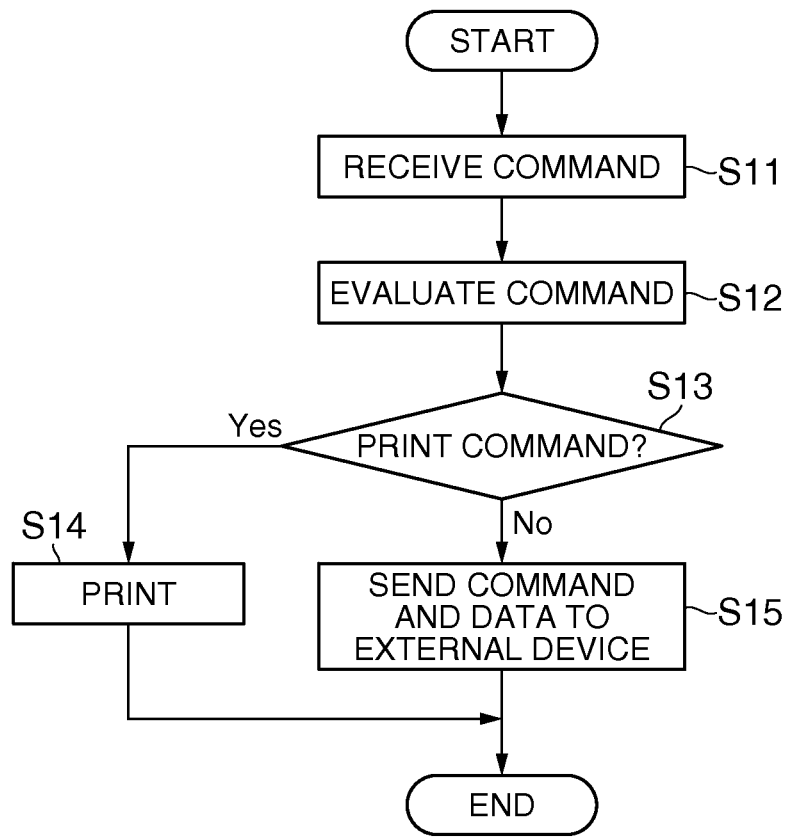
FIG. 8 is a flow chart of the operation of a printer according to the third embodiment of the invention.

The operation of the printer 500 as an example of a media processing device is described next with reference to FIG. 8. FIG. 8 is a flow chart showing the operation of the printer 500.

As shown in FIG. 8, when the control unit 550 detects receiving a command through the first interface 510 (step S11), the command identifier 551 determines if the received command is a command related to the roll paper print unit 530 (step S12). If the received command is a command related to the roll paper print unit 530 (step S13 returns YES), the command identifier 551 executes the command using the process controller 555, and the process controller 555 prints with the roll paper print unit 530 (step S14).

If the command identifier 551 determines the received command is not a command related to the roll paper print unit 530 (step S13 returns NO), the command identifier 551 causes the relay controller 553 to output the command from the second interface 515 (step S15).

As described above, a POS system 1 according to this embodiment of the invention includes a POS terminal 20 that outputs commands, a printer 500, and a multifunction device 400. The printer 500 has a roll paper print unit 530; a first interface 510 that receives commands sent from a POS terminal 20; a second interface 515 that outputs commands received by the first interface 510; and a control unit 550 that controls the roll paper print unit 530 to execute the received command when a command received by the first interface 510 is a command to be executed by the roll paper print unit 530, and controls outputting the command through the second interface 515 to the printer 200 and when the command is not a command that is executed by the roll paper print unit 530. The multifunction device 400 has an interface 410 that is connected to the second interface 515 of the printer 500 and receives commands sent from the second interface 515, and a roll paper print unit 420 that executes a process common to the roll paper print unit 530 of the printer 500 based on the command received by the interface 410.

The printer 500 can therefore receive commands output from the POS terminal 20 and process media with the roll paper print unit 530 based on the received commands, and send the command to the multifunction device 400 for processing by the multifunction device 400 if the received command is not a command executed by the roll paper print unit 530. As a result, the POS terminal 20 can output commands, and the printer 500 and multifunction device 400 can process the commands appropriately based on the functions that each device can execute. The printer 500 and multifunction device 400 can therefore be appropriately used for different purposes without the POS terminal 20 controlling command distribution based on the functions that can be executed by the printer 500 and multifunction device 400.

In addition to the first interface 510 that connects to the POS terminal 20, the printer 500 also has a second interface 515 that connects to the multifunction device 400. The POS terminal 20 can therefore output commands in the same way as when the POS terminal 20 controls only the printer 500, and the functions and software of the POS terminal 20 do not need to be specially configured to use plural processing devices. For example, an existing POS terminal 20 can be used without modification.

The multifunction device 400 has a magnetic reader 430 and form print unit 440 that execute processes different from the roll paper print unit 530 of the printer 500, and processes media differently than the printer 500 according to the received command when a command that is not executed by the printer 500 is sent to the multifunction device 400. Whether the printer 500 executes a process or the multifunction device 400 executes a process changes according to the content of the process corresponding to the command output from the POS terminal 20. The printer 500 and multifunction device 400 can therefore be used appropriately according to the process to be performed.

When the command identifier 551 determines that a command relates to the roll paper print unit 530, the control unit 550 in this embodiment always executes the command using the process controller 555, but the invention is not so limited. For example, when specific conditions are met, the command identifier 551 could send the received command from the second interface 515 to the multifunction device 400 even if the command received through the first interface 510 is a command related to the roll paper print unit 530.

In this embodiment, the printer 500 stores a condition for determining if a command received by the first interface 510 is executed by the roll paper print unit 530, or is relayed through the second interface 515 to the multifunction device 400, in ROM or other storage unit (not shown in the figure) accessible to the control unit 550. If the stored condition is met, the control unit 550 sends the command received by the first interface 510 from the second interface 515 to the multifunction device 400 even if the command received by the first interface 510 is a command that may be executed by the roll paper print unit 530. When a stored condition is met in this implementation, the printer 500 sends the received commands to the multifunction device 400 even if the commands received from the POS terminal 20 include a command that may be executed by the roll paper print unit 530. In other words, functions that can be executed by the printer 500 can also be sent to and executed by the multifunction device 400. The printer 500 and multifunction device 400 can thus be appropriately used in various ways.

An example of a predetermined, stored condition is using a hardware switch (not shown in the figure) or operating panel (not shown in the figure) of the printer 500 to set the multifunction device 400 for use with priority over the printer 500. Other examples of such a condition includes detecting that the roll paper print unit 530 has run out of roll paper, detecting an error such as the printhead (not shown in the figure) overheating or a paper jam in the roll paper print unit 530, and other events preventing the roll paper print unit 530 from printing. In such situations when the roll paper print unit 530 cannot print, a receipt R can be printed using the multifunction device 400 instead. The printer 500 and multifunction device 400 can thus be appropriately used in various ways.

The invention is described above with reference to a preferred embodiment thereof, but the invention is not limited thereto and can be modified and adapted in many ways without departing from the scope of the accompanying claims. Examples of such variations are described below.

Configurations having a printer 200, 300, 500 and a multifunction device 100, 400 and printer 200 that print on roll paper are described above as examples of media processing devices that process media and external processing devices in the foregoing embodiments, but the invention is not so limited. For example, the media is a plastic sheet and media with a coated surface can also be used. Other examples of usable media include cut-sheet media of a predefined size, and continuous media such as sprocket-feed paper. Photocopier paper can also be used as the media.

The roll paper print units 120, 220, 330, 530, 420 are also not limited to thermal print units that print by applying heat to thermal paper, and could use other recording methods including inkjet and dot impact.

Magnetic readers 130, 430 and form print units 140, 440 are also described in the foregoing embodiments as examples of non-printing process units of the multifunction device 100, 400, but the invention is not so limited. For example, these other processing units could be print units that print on various types of media, a scanner that optically reads checks or other media, or an authentication unit that reads an IC card.

The configuration of the POS system 1, 2, 3 is also not limited to the foregoing, and a configuration having a single function printer connected to the POS terminal 20 with the multifunction device connected to this printer is also conceivable.

A POS terminal 20 is also described in the foregoing embodiments as an example of a host computer, but the invention is not so limited. The host computer can be any device with the ability to send commands and text data to a multifunction device 100, printer 500, or other media processing device, and could be a common personal computer, a mainframe computer, a server, or other computer device, or a mobile device. The application of the host computer is also not limited to processing transactions in a POS system, and the invention can also be used in systems including a computer that is used for common applications such as document processing and image editing, or for other specialized applications.

The function blocks shown in FIG. 1, FIG. 2, FIG. 4, FIG. 5, and FIG. 7 can be desirably achieved by the cooperation of hardware and software, and do not suggest a specific hardware configuration.

For example, the function of the control unit 150, 550 can be achieved by the control unit 150, 550 of the multifunction device 100 or printer 500 executing a program stored on an externally connected storage medium. The details of such a configuration can obviously also be changed as desired.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device comprising:
   a print unit that processes media, including printing text on a specific sheet;
   a first connection unit that receives data including a command and text data sent from a host computer;
   an interpreting unit that searches the text data for a predetermined string, which is a string that is not printed by the print unit, and determines if a string that is not printed by the print unit is included in the text data received by the first connection unit;
   a second connection unit that connects to an external processing device; and
   a control unit that controls executing a process by the print unit, or controls sending the data received by the first connection unit to the external processing device connected to the second connection unit, based on the data received by the first connection unit;
   wherein the control unit executes control based on the result, of interpretation by the interpreting unit.

2. The media processing device described in claim 1, wherein:
   when the control unit controls executing a process by the print unit based on the string detected by the interpreting unit, the print unit prints the text data remaining after removing the predetermined string from the received text data.

3. The media processing device described in claim 1, further comprising:
   a conversion unit that converts a command received by the first connection unit to a command processed by the print unit or a command processed by the external processing device.

4. The media processing device described in claim 1, wherein:
   the external processing device performs a process common to the processing print unit; and
   the control unit controls executing a process by the print unit, or controls sending the command received by the first connection unit to the external processing device connected to the second connection unit, based on the command received by the first connection unit.

5. The media processing device described in claim 4, wherein:
   when a command received by the first connection unit is a command executed by the print unit, the control unit causes the print unit to execute the command, and
   when a command received by the first connection unit is a command other than a command executed by the print unit, the control unit sends the command from the second connection unit to the external processing device.

6. The media processing device described in claim 1, further comprising:
   a storage unit that stores a condition for executing a command received by the first connection unit on the print unit, or sending the received command by the second connection unit to the external processing device;

wherein when the condition stored in the storage unit is met, the control unit sends the command received by the first connection unit through the second connection unit to the external processing device even if the command received by the first connection unit is a command executed by the print unit.

7. The media processing device described in claim 6, further comprising:

a setting unit that sets the condition.

8. A point-of-sale (POS) system comprising:

a POS terminal that sends data including a command and text data;

a first media processing device including a print unit that processes media and prints a receipt,
  a first connection unit that receives the data sent from the POS terminal,
  an interpreting unit that searches the text data received by the first connection unit for a predetermined string, which is a string that is not printed by the print unit, and determines if a string that is not printed by the print unit is included in the text data,
  a control unit that changes to a first operating mode that executes a process with the print unit, or a second operating mode that transmits the text data received by the first connection unit, and controls operation in the first operating mode or second operating mode, based on the result of searching by the interpreting unit, and
  a second connection unit that transmits the text data when the second operating mode is enabled; and a second media processing device including a receiving unit that connects to the second connection unit of the first media processing device, and receives data transmitted from the second connection unit, and
  a media processing unit that performs a process common to the print unit of the first media processing device based on data received by the receiving unit.

9. The POS system described in claim 8, wherein:

the media processing unit of the second media processing device is a second print unit that prints a receipt;

the first media processing device transmits the data from the second connection unit when the control unit changes to the second operating mode; and the second media processing device receives the data by the receiving unit and prints a receipt by the second print unit.

10. A point-of-sale (POS) system comprising:

a POS terminal that transmits a command;

a first media processing device including a print unit that performs a first process on a recording medium and prints a receipt,
  a first connection unit that receives a command transmitted from the POS terminal,
  an interpreting unit that searches text, data received by the first connection unit for a determined string, and determines if a string that is not printed by the print unit is included in the text data;
  a control unit that controls executing the command by the processing unit when the command received by the first connection unit is a command executed by the print unit, and controls transmitting the command when the command is a command other than a command executed by the processing unit, and
  a second connection unit that transmits the command when controlled to transmit the command; and a second media processing device including a receiving unit that connects to the second connection unit of the first media processing device and receives a command transmitted from the second connection unit, and
  a media processing unit that performs a process common to the print unit of the first media processing device based on the command received by the receiving unit.

11. The POS system described in claim 10, wherein:

the first media processing device includes a storage unit that stores a condition for executing a command received by the first connection unit on the print unit, or sending the received command by the second connection unit to the external processing device; and when the condition stored in the storage unit is met, the control unit sends the command received by the first connection unit through the second connection unit to the external processing device even if the command received by the first connection unit is a command executed by the print unit.

12. The POS system described in claim 11, wherein:

the second media processing device includes a second media processing unit that performs a different process than the print unit of the first media processing device.

* * * * *